(12) United States Patent
Perfetto et al.

(10) Patent No.: US 11,680,545 B2
(45) Date of Patent: Jun. 20, 2023

(54) PROPANE FUEL SYSTEM TEMPERATURE CONTROL SYSTEMS AND METHODS

(71) Applicant: Cummins Inc., Columbus, IN (US)

(72) Inventors: Anthony Kyle Perfetto, Columbus, IN (US); Samuel C. Geckler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 247 days.

(21) Appl. No.: 17/319,436

(22) Filed: May 13, 2021

(65) Prior Publication Data

US 2021/0262423 A1 Aug. 26, 2021

Related U.S. Application Data

(63) Continuation of application No. 15/842,004, filed on Dec. 14, 2017, now Pat. No. 11,035,326.

(51) Int. Cl.
| | |
|---|---|
| *F02M 31/20* | (2006.01) |
| *F02M 37/20* | (2006.01) |
| *F02M 37/00* | (2006.01) |
| *F02D 19/02* | (2006.01) |
| *F02M 21/02* | (2006.01) |

(52) U.S. Cl.
CPC ......... *F02M 31/205* (2013.01); *F02D 19/022* (2013.01); *F02D 19/027* (2013.01); *F02M 21/0212* (2013.01); *F02M 21/0227* (2013.01); *F02M 21/0287* (2013.01); *F02M 37/0052* (2013.01); *F02M 37/0064* (2013.01); *F02M 37/20* (2013.01)

(58) Field of Classification Search
CPC ........... F02M 21/0212; F02M 21/0218; F02M 21/0221; F02M 21/0227; F02M 21/023; F02M 21/0242; F02M 21/0245; F02M 21/0287; F02M 37/0052; F02M 37/20; Y02T 10/03; F01P 2003/005; F02D 2250/02; F02D 2250/04; F02D 41/003; F02D 2200/0602; F02D 2200/0606; F02D 2200/1002; F02D 2200/1004; F02D 19/022; F02D 19/026; F02D 19/027; F02D 19/028; F02D 19/0605; F02D 19/0647; F02D 19/0684; F02D 19/0615; F02D 19/0628; F02D 19/0668; F02D 19/0671

See application file for complete search history.

(56) References Cited

U.S. PATENT DOCUMENTS

| | | | |
|---|---|---|---|
| 4,228,776 | A | 10/1980 | Gallione et al. |
| 4,475,523 | A | 10/1984 | Goranflo |
| 4,872,438 | A | 10/1989 | Ausiello et al. |
| 5,325,838 | A | 7/1994 | Bennett |

(Continued)

OTHER PUBLICATIONS

[Online] [Retrieved on Sep. 2, 2020] Retrieved from https://www.chenn.purdue.edu/gchelp/liquids/vpress.htnnl#:-:text=The%20vapor%20pressure%20of%20a%20liquid%20varies%20with%20its%20tennperature,decreases%20as%20the%20tennperature%20decreases. PDF of web article provided (Year: 2020).

(Continued)

*Primary Examiner* — John Kwon
(74) *Attorney, Agent, or Firm* — Taft, Stettinius & Hollister LLP

(57) ABSTRACT

Systems and methods for thermal management of a direct injection propane fuel system are disclosed that include control a temperature of the fuel tank at or below a desired operating temperature to avoid venting of fuel to atmosphere.

20 Claims, 3 Drawing Sheets

(56) References Cited

U.S. PATENT DOCUMENTS

| | | |
|---|---|---|
| 6,234,151 B1 | 5/2001 | Eck |
| 6,250,290 B1 | 6/2001 | Mullen |
| 6,269,803 B1 * | 8/2001 | Corkill ............... F02M 25/0809 |
| | | 123/520 |
| 8,196,567 B2 | 6/2012 | Pursifull et al. |
| 8,516,997 B2 | 8/2013 | Pursifull |
| 8,635,991 B2 | 1/2014 | Pursifull |
| 8,783,281 B2 | 7/2014 | Carter et al. |
| 8,833,341 B2 | 9/2014 | Wong et al. |
| 9,422,892 B2 | 8/2016 | Pursifull |
| 10,850,712 B2 | 12/2020 | Dudar |
| 11,035,326 B2 * | 6/2021 | Perfetto ................ F02D 19/022 |
| 2011/0023833 A1 | 2/2011 | Chamarthi et al. |
| 2013/0206115 A1 | 8/2013 | Kragh |
| 2016/0341156 A1 | 11/2016 | Yang et al. |
| 2017/0260917 A1 | 9/2017 | Burger et al. |
| 2019/0186440 A1 * | 6/2019 | Perfetto ............. F02M 37/0052 |
| 2020/0149483 A1 * | 5/2020 | Dudar ................ F02M 25/0836 |
| 2021/0262423 A1 * | 8/2021 | Perfetto ............. F02M 37/0052 |
| 2022/0105797 A1 * | 4/2022 | Vulkan ............ B60K 15/03519 |

OTHER PUBLICATIONS

Online] [Retrieved on Sep. 2, 2020] Retrieved from http://glossary.annetsoc.org/wiki/Clausius-clapeyron equation#:-:text=(Also%20called%20Clapeyron%20equation%2C%20Clapeyron,the%20substance%20are%20in%20equilibriunn.&text=where%20T%20is%20tennperature%20in,vapor%20pressure%20is%20in%20kPa. PDF provided. (Year: 2020).
PDF of https://web.archive.org/web/20161208201445/https://www.explainthatstuff.conn/refrigerator.htnnl (Woodford) (Year: 2016).

* cited by examiner

PROPANE FUEL SYSTEM TEMPERATURE CONTROL SYSTEMS AND METHODS

FIELD OF THE INVENTION

This disclosure relates generally to internal combustion engines, and more particularly to systems and methods for temperature control of a fuel for direct injection into an internal combustion engine.

BACKGROUND

Propane fuel can be directly injected into a combustion chamber of an internal combustion engine. Thermal management of the fuel stream from the fuel tank to the direct injector(s) remains a challenge since propane is a gaseous fuel at normal atmospheric conditions but is stored as a liquid under pressure in the fuel tank. At normal ambient temperature, the fuel tank pressure is approximately 150 pounds per square inch (PSI.) At elevated tank or ambient temperatures, the fuel tank pressure can rise up to about 300 PSI before the pressure relief valve on the fuel tank opens to release propane vapor so that the fuel tank does not exceed its pressure limit.

In a direct injection liquid propane fuel system, the fuel from the fuel tank can vaporize on the way to the injector if the liquid fuel becomes hotter than the fuel tank. This vaporized fuel does not pump the same as liquid fuel, which creates a fuel flow control problem. Therefore, it is desirable to maintain liquid fuel at the direct injection high pressure pump where the fuel is pressurized into the high pressure fuel rail.

One method of keeping fuel as a liquid fuel at the high pressure pump involves circulating fuel back to the fuel tank from the high pressure pump inlet. This pulls any vaporized fuel back to the fuel tank and maintains a steady supply of liquid fuel at the pump inlet. One drawback to this approach is that heat is returned to the vehicle fuel tank along with the vaporized fuel, which raises the fuel tank temperature. When the fuel tank temperature goes above a certain temperature, such as about 140° F., the pressure in the fuel tank may exceed the pressure rating of the fuel tank and the pressure relief valve will open and release vaporized fuel from the tank. Since it is not desirable to release fuel from the fuel tank to the atmosphere, further improvements in this area for managing the temperature and pressure of the fuel are desirable.

SUMMARY

Systems and methods for controlling propane fuel system temperature are disclosed. The systems and methods include controlling a temperature and/or pressure of a fuel tank of the fuel system to prevent the release of fuel vapor to atmosphere in response to an over-pressure or over-temperature condition at the fuel tank. The temperature and/or pressure conditions can be controlled at the fuel tank, at the fuel return line to the tank, and combinations of these.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
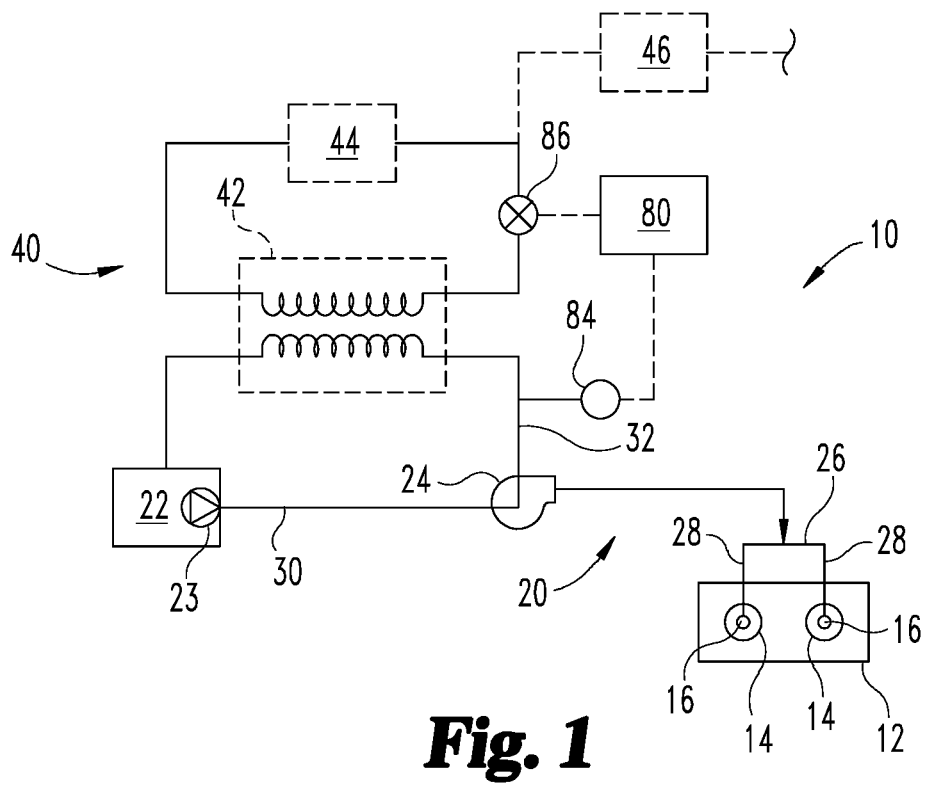
FIG. 1 shows one embodiment of an internal combustion engine and fuel system along with one embodiment of a thermal management system for controlling the temperature and/or pressure of the fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 10 includes an internal combustion engine 12. FIG. 1 illustrates an embodiment where the engine 12 is a propane fueled engine, but other engine and fuel types are not precluded. The engine 12 can include a plurality of cylinders 14. FIG. 1 illustrates the plurality of cylinders 14 in an arrangement that includes two cylinders in an in-line arrangement for illustration purposes only. Any number of cylinders and any arrangement of the cylinders suitable for use in an internal combustion engine can be utilized. The number of cylinders 14 that can be used can range from one cylinder to eighteen or more. Furthermore, the following description at times will be in reference to one of the cylinders 14. It is to be realized that corresponding features in reference to the described cylinder 14 can be present for all or a subset of the other cylinders of engine 12.

The cylinder 14 typically houses a piston (not shown) that is operably attached to a crankshaft (not shown) that is rotated by reciprocal movement of piston (not shown) in cylinder 14. A direct injector 16 provides fuel to a combustion chamber (not shown) formed by the respective cylinder 14. In other embodiments, fuel can additionally be provided to combustion chamber by port injection, or by injection in the intake system, upstream of the combustion chambers of cylinders 14, as discussed further below.

The fuel from the direct injector 16 is supplied by a high pressure fuel system 20 that is connected to the fuel tank 22. Fuel from the fuel tank 22 is pumped or circulated by a low pressure pump 23 to a high pressure fuel pump 24 through a feed line 30 and fed to a common-rail 26 connected to the direct injectors 16. The fuel fed from the high pressure fuel pump 24 is accumulated in the common-rail 26, and the accumulated fuel is supplied to the direct injector 16 of each cylinder 14 through a distribution line 28. The accumulated fuel in common rail 26 can be pressurized to boost and control the fuel pressure of the fuel delivered to combustion chamber of each cylinder 14. The high pressure fuel system 20 may include additional features not specifically disclosed herein, such as sensors, check valves, distribution pumps, etc.

In the disclosed embodiment, the fuel supplied by the high pressure fuel system 20 is propane fuel that is stored under pressure in fuel tank 22. During delivery of the fuel to fuel pump 24 the fuel may increase in temperature and vaporize in feed line 30 and/or fuel tank 22. A fuel return line 32 returns fuel, including liquid fuel and/or fuel vapor, from the inlet of high pressure fuel pump 24 back to the fuel tank 22 to ensure a constant source of liquid fuel is available at high pressure fuel pump 24. In other embodiments, the fuel return line 32 alternatively or additionally returns fuel from downstream of high pressure fuel pump 24. This return of fuel can increase the temperature of the fuel tank 22.

System 10 includes a cooling system 40 that includes cooling the fuel in the fuel return line 32 and/or in the fuel tank 22 so the fuel is the cooling fluid for the fuel tank 22. The cooling of the fuel is controlled by a controller 80 to maintain fuel tank 22 at a desired temperature and pressure condition to avoid a pressure release condition in which fuel is vented to atmosphere from fuel tank 22. In FIG. 1 the cooling system 40 includes, in one embodiment, an air based heat exchanger 42 for exchanging heat from the fuel in fuel return line 32 with the cooling fluid. The air cooling fluid is passed over fuel return line 32 to thermally exchange heat from the fuel in fuel return line 32. The air reduces the temperature of the fuel being returned to fuel tank 22, which reduces the temperature and resulting pressure increase in fuel tank 22. The air can be provided by, for example, a fan and/or wind air flow generated by a vehicle while travelling.

In another embodiment, the heat exchanger 42 is a liquid based heat exchanger that provides a cooling fluid to exchange heat with the fuel in fuel return line 32. The cooling fluid may transfer the heat to air such as through an air-to-liquid heat exchanger 44. In another embodiment, the cooling fluid from heat exchanger 42 is provided to an inlet of an air conditioning evaporator 46 of a vehicle being propelled by engine 12.

Figure 2:
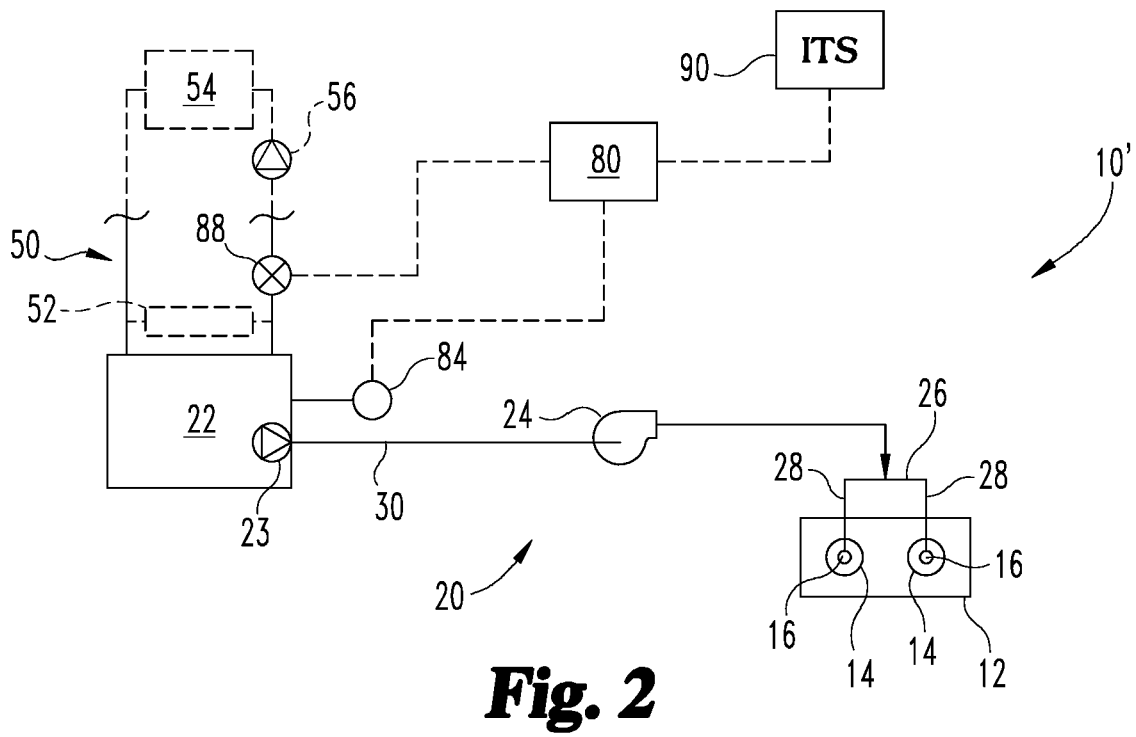
FIG. 2 is a schematic illustration of another embodiment system for thermal management of the fuel system.

In another embodiment shown in FIG. 2, there is a system 10' that is similar to system 10 except that the fuel tank 22 is directly cooled by a cooling system 50. In system 10', the cooling system 50 can be provided as a part of the vehicle's air conditioning system 52 in which circulation of the cooling fluid around fuel tank 22 is controlled based on a temperature and/or pressure condition of fuel tank 22 to maintain a desired target condition and/or to avoid exceeding a threshold temperature and/or pressure condition.

In another embodiment of system 10', the cooling system 50 is provided as a separate cooling circuit for cooling the fuel tank 22. In this embodiment, fuel from fuel tank 22 is pulled from the fuel tank 22 and pumped with a pump 56 to a higher pressure and temperature location at a heat exchanger 54, such as a refrigerant-to-air heat exchanger, to dump the heat from the fuel vapor to ambient. The fuel cools and any fuel vapor condenses and returns to the fuel tank 22 as liquid to provide cooling. The pumping of fuel and vapor from fuel tank 22 can be controlled based on tank temperature and/or tank pressure to maintain the temperature and/or pressure at a target condition and/or below a desired threshold level. In one embodiment, the fuel tank 22 can be pre-cooled based on one or more temperature condition inputs, such as a temperature forecast from an intelligent transportation system 90 in communication with controller 80. The fuel level in fuel tank 22 is another example input upon which pre-cooling fuel tank 22 can be based. For example, the fuel tank temperature/pressure target may be lower as the fuel level drops in anticipation of a fuel refill event where it is desirable to have a lower pressure level in the fuel tank during a fuel fill event.

Figure 3:
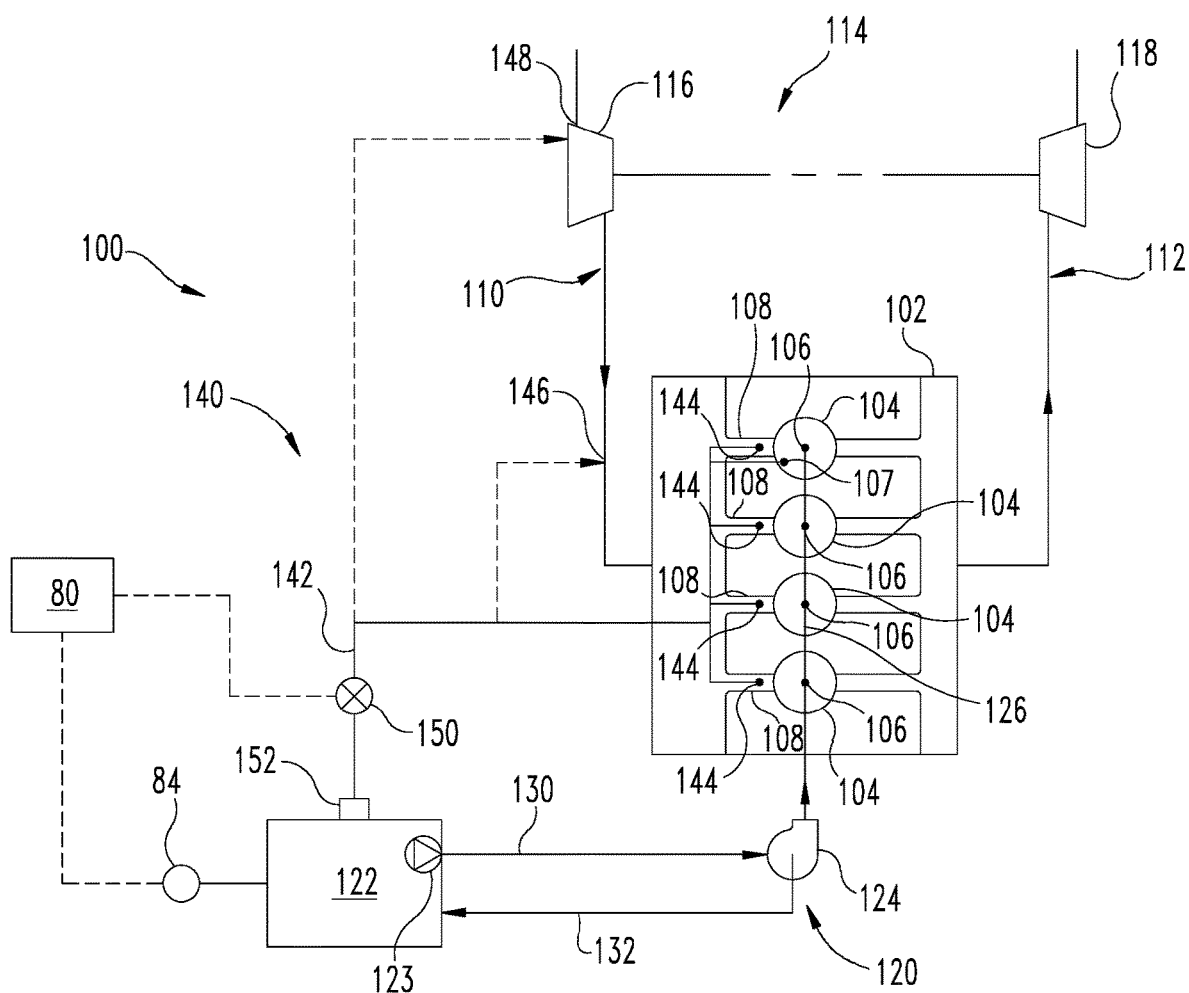
FIG. 3 is a schematic illustration of another embodiment system for thermal management of the fuel system.

Referring to FIG. 3, another embodiment system 100 is shown that includes an internal combustion engine 102 with a plurality of cylinders 104 that receive fuel from a fuel system 120 through a plurality of direct injectors 106 each associated with a respective cylinder 104. As discussed above, any number and arrangement of cylinders 104 is contemplated. Engine 102 is further shown with an intake system 110 and an exhaust system 112. A turbocharger 114 is provided with a compressor 116 in the intake system 110 and a turbine 118 in the exhaust system 112. Each of the cylinders 104 may include an intake manifold port 108 for providing a charge flow to the combustion chamber of the connected cylinder 104.

The fuel system 120 includes a fuel tank 122, a low pressure or distribution pump 123, a high pressure fuel pump 124 that is connected to a common rail 126 to distribute fuel to the direct injectors 106, a fuel feed line 130 connecting fuel tank 122 and fuel pump 124, and a fuel return line 132 connecting an inlet of high pressure fuel pump 124 with the fuel tank 122 for returning fuel vapor to fuel tank 122. In other embodiments, the fuel return line alternatively or additionally returns fuel from downstream of fuel pump 124. The high pressure fuel system 120 may include additional features not specifically disclosed herein, such as sensors, check valves, distribution pumps, etc.

The system 100 also includes a cooling system 140 for cooling fuel tank 122. Cooling system 140 includes a fuel vapor evacuation line 142 that pulls fuel vapor from fuel tank 122 and fed to engine 102 to provide cooling and/or pressure reduction of fuel tank 122. The vapor pulled from fuel tank 122 allows liquid to evaporate in fuel tank 122 to maintain tank pressure which will drop the tank temperature.

In one embodiment, the vapor from fuel tank 122 is fed to engine 102 through port injectors 144 associated with the intake manifold ports 108 of the cylinders 104. In another embodiment, the fuel vapor is provided at a common intake port 146 upstream of the intake manifold ports 108. In yet another embodiment, the fuel vapor is provided at a compressor inlet port 148. In yet another embodiment, the fuel vapor is supplied to engine 102 through an evaporative emissions control system (not shown). In certain embodiments, controller 80 controls a control valve 150 to release the fuel vapor from fuel tank 122 in response to a temperature and/or pressure condition of fuel tank 122. Control valve 150 may also be controlled based on engine load conditions so that fuel vapor is provided to engine 102 only during low load conditions to minimize any combustion phasing penalty. A pressure regulator 152 can be provided to drop the tank pressure to an acceptable level for port injection.

In another embodiment, the fuel vapor is provided to a second direct injector 107 of one or more of the cylinders 104 without the use of a pressure regulator or pump. This second direct injection system is controlled independently of the system including direct injectors 106.

Figure 4:
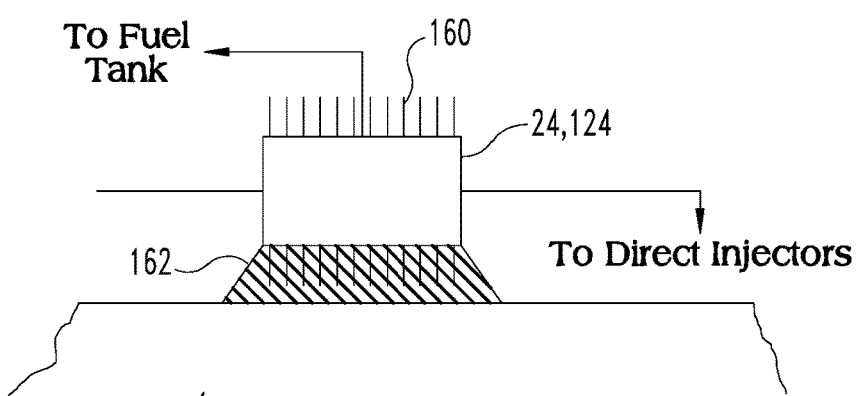
FIG. 4 is a schematic illustration of a fuel pump with thermal management features to limit the temperature increase of the fuel at the fuel pump.

It is further contemplated that the heat input to fuel pump 24, 124 can be reduced so that less heat is recirculated back to fuel tank 22, 122 through the fuel return line. For example, as shown in FIG. 4, fuel pump 24, 124 can include cooling fins 160 extending outwardly from a body of the fuel pump to provide increased surface area for receiving ambient air circulate around the fuel pump 24, 124. In addition, fuel pump 24, 124 can be thermally isolated from the heat sources, such as engine 12, 102, by a thermal gasket 162 between the pump body and the heat source. In still other embodiments, a pushrod or other device can be used to drive the fuel pump 24, 124 to isolate the pump from oil and coolant temperature influences from engine 12, 102.

A controller 80 is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10, 10', 100 includes various sensors such as a pressure/temperature sensor 84 on fuel return line 32 to detect the fuel pressure and/or other properties of the fuel in fuel return line 32. Additionally or alternatively, as shown in FIGS. 2-3, a pressure/temperature sensor 84 on fuel tank 22 detects the fuel pressure and/or other properties of the fuel in fuel tank 22. Any other sensors known in the art for engine 12, 102 and fuel systems are also contemplated, such as engine speed and/or load sensors. System 10 can also include various actuators for opening and closing one or more control valves 86, 88 and/or operating one or more fans, louvres, or other devices to control the cooling fluid flow. The actuators are not illustrated in FIGS. 1-3, but one skilled in the art would know how to implement the mechanism needed for each of the components to perform the intended function.

During operation, the controller 80 can receive information from the various sensors listed above through the I/O interface, process the received information using the processor based on an algorithm stored in the memory, and then send command signals to the various actuators through the I/O interface. For example, the controller 80 can receive information regarding a temperature input, process the temperature input, and then based on the temperature input and control strategy, send one or more command signals to one or more actuators of control valves 86, 88 to reduce a temperature and/or pressure of the fuel and/or fuel tank 22, 122 to achieve a target condition for thermal management of the fuel system 20, 120.

The control procedures implemented by the controller 80 can be executed by a processor of controller 80 executing program instructions (algorithms) stored in the memory of the controller 80. The descriptions herein can be implemented with system 10, 10', and/or 100. In certain embodiments, the system 10, 10', 100 further includes a controller 80 structured or configured to perform certain operations to control system 10, 10', 100 in achieving one or more target conditions. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 5:
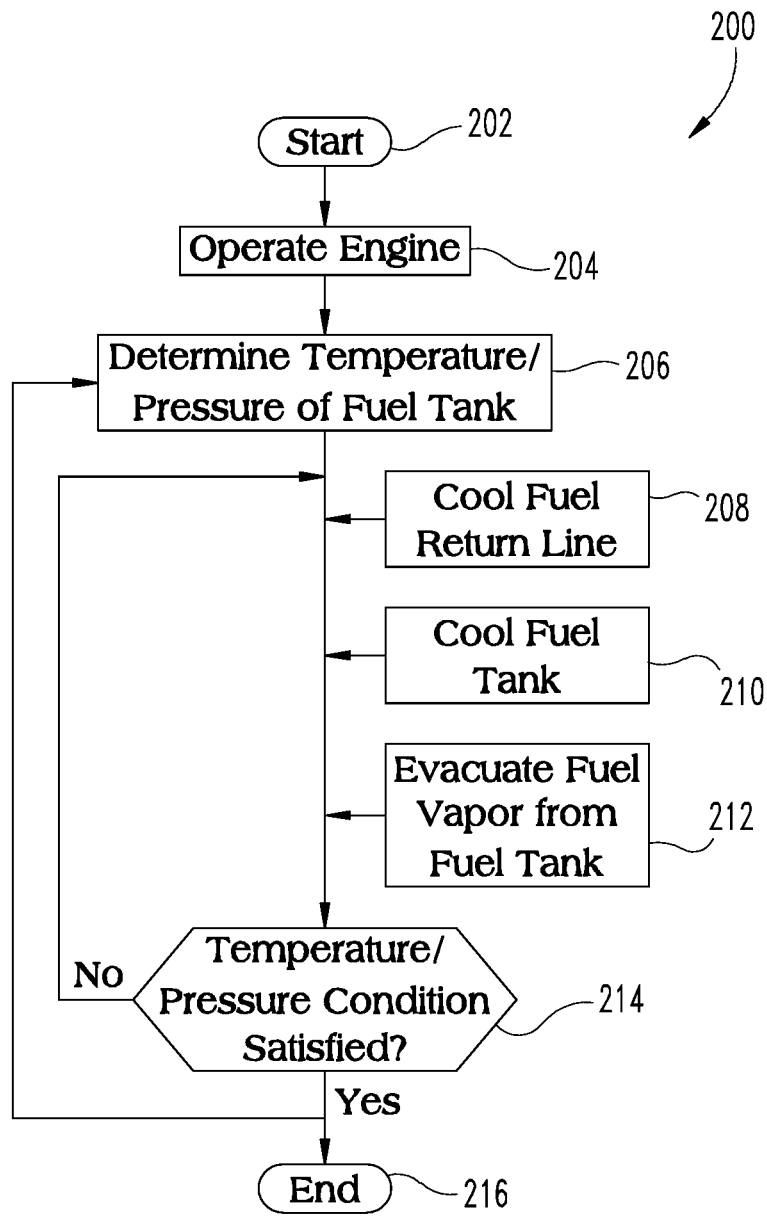
FIG. 5 shows a flow diagram of one embodiment of a procedure for managing the temperature of the fuel system of the internal combustion engine.

Referring to FIG. 5, a flow diagram of a procedure 200 for controlling the temperature of the fuel system 20, 120 is provided. Procedure 200 begins at 202 with a key-on event, an engine start-up event, and/or other initiation event that occurs periodically in response to conditions indicating a thermal management condition may exist, such as a temperature or pressure condition of fuel tank 22, 122 and/or fuel return line 32, 132. The procedure 200 continues at operation 204 in which the engine start-up event causes the internal combustion engine 12, 102 to operate to receive a charge flow in the cylinders 14, 104 and an injection of a propane fuel from fuel tank 22, 122 of fuel system 20, 120.

Procedure 200 continues at operation 206 to determine a temperature and/or pressure condition of the fuel tank 22, 122 for control to maintain the temperature and/or pressure below a temperature threshold associated with a pressure relief condition of the fuel tank 20, 122. The temperature and/or pressure can be controlled, for example, by circulating a cooling fluid to exchange heat with the fuel system, and/or by evacuating a fuel vapor from the fuel tank 22, 122 for combustion by the internal combustion engine 12, 102.

In one embodiment of procedure 200, the temperature of the fuel tank 22, 122 is controlled via an operation 208 to cool the fuel return line by, for example, circulating a cooling fluid to exchange heat with vaporized fuel in a return line that returns the vaporized fuel from a pump of the fuel system 20, 120 to the fuel tank 22, 122. The cooling fluid can be air that is circulated across the return line, or a liquid that is part of a liquid heat exchanger system in which the cooling fluid is cooled by air. In a further embodiment, the liquid heat exchanger system comprises a portion of an air conditioning system of a vehicle.

In another embodiment, the procedure 200 includes an operation 210 to cool the fuel tank 22, 122 with a cooling fluid that exchanges heat with the fuel tank. In one embodiment, the cooling fluid is provided by the air conditioning system of the vehicle. In another embodiment, fuel vapor is evacuated from the fuel tank 22, 122 and cooled in an active cooling loop that is separate from the air conditioning system. The cooling of the fuel tank can be controlled in response to at least one of a temperature condition and a pressure condition of the fuel tank to actively cool the fuel tank.

In yet another embodiment, the procedure 200 includes an operation to evacuate fuel vapor from the fuel tank 22, 122 to cool the fuel tank. The evacuated fuel vapor can be provided to the engine 12, 102 via intake ports of the cylinders, via a common intake port, via a port at a compressor inlet of the intake system, via direct injectors dedicated to providing the evacuated fuel vapor, or via an evaporative emission controls system. In certain embodiments, the fuel vapor is evacuated to the engine only during load conditions less than a threshold amount that do not result in a significant combustion phasing penalty, such as during low load conditions (e.g. less than 50% of peak load, or less than 25% of peak load) of the engine 12, 102.

Procedure 200 continues at conditional 214 to determine the temperature and/or pressure condition and if the temperature and/or pressure condition of the fuel tank 22, 122 is at a target condition. If conditional 24 is negative, procedure 200 returns to continue to control the temperature/pressure condition according to one or more of operations 208, 210, 212. If conditional 214 is positive, procedure 200 can end or return to operation 206 to continue to monitor the temperature/pressure conditions or end at 216 in response to, for example, a key off event.

Various aspects of the present disclosure are contemplated. In one aspect, a method includes: operating an internal combustion engine system including an internal combustion engine with a plurality of cylinders that receive a charge flow and a fuel from a fuel tank of a fuel system; and maintaining a temperature of the fuel tank below a temperature threshold associated with a pressure relief condition of the fuel tank. The temperature is maintained by at least one of circulating a cooling fluid to exchange heat with the fuel system and circulating the fuel from the fuel tank to cool the fuel for return to the fuel tank.

In one embodiment, maintaining the temperature includes exchanging heat with circulating fuel in a return line that returns the fuel from a high pressure pump of the fuel system that is downstream of the fuel tank to provide cooling of the fuel tank. In a refinement of this embodiment, the circulating fuel exchanges heat with air. In another embodiment, the cooling fluid is a liquid and is circulated in a liquid heat exchanger system that cools the cooling fluid with air. In a refinement of this embodiment, the liquid heat exchanger system comprises a portion of an air conditioning system of a vehicle.

In another embodiment, maintaining the temperature includes circulating the cooling fluid and the cooling fluid exchanges heat directly with the fuel tank. In one refinement of this embodiment, the cooling fluid is circulated to exchange heat with the fuel tank in response to at least one of a temperature condition and a pressure condition of the fuel tank to actively cool the fuel tank.

According to another aspect, a method includes operating an internal combustion engine system including an internal combustion engine with a plurality of cylinders that receive a charge flow and a fuel from a fuel tank of a fuel system and maintaining a temperature of the fuel tank below a temperature threshold associated with a pressure relief condition of the fuel tank. Maintaining the temperature includes evacuating a fuel vapor from the fuel tank for combustion by the internal combustion engine.

In one embodiment, maintaining the temperature includes evacuating the fuel vapor from the fuel tank to an intake system of the internal combustion engine. In one refinement of this embodiment, the fuel vapor is evacuated to at least one of upstream of a compressor of the intake system and a port injector at an intake port of each of the plurality of cylinders. In another refinement, the fuel vapor is evacuated into a direct injector connected to an intake flow to one of the plurality of cylinders. In yet another refinement, the evacuation of the fuel vapor is controlled to occur in response to a load condition of the internal combustion engine being less than a threshold amount.

According to another aspect of the present disclosure, a system includes an internal combustion engine including a plurality of cylinders that receive a fuel from a fuel tank. The fuel tank is connected to each of the plurality of cylinders with a direct injector and a fuel pump. A return line connects the fuel pump to the fuel tank for returning fuel to the fuel tank. A cooling fluid is thermally coupled with at least one of the fuel tank and the return line to exchange heat with the fuel to control at least one of a temperature and a pressure in the fuel tank below a threshold amount.

In one embodiment, the cooling fluid is thermally coupled with the return line via a heat exchanger to cool the fuel in the return line. In a refinement of this embodiment, the heat exchanger is connected with an air conditioning system of the vehicle.

In another embodiment, the cooling fluid is thermally coupled with the fuel tank via a heat exchanger. In a refinement of this embodiment, the heat exchanger is connected with an air conditioning system of the vehicle.

In another embodiment, a heat insulation barrier is provided between the internal combustion engine and the fuel pump to thermally isolate the fuel pump from the internal combustion engine. The fuel pump may also include cooling fins.

In another aspect of the present disclosure, a system includes an internal combustion engine including a plurality of cylinders that receive a fuel from a fuel tank. The fuel tank is connected to each of the plurality of cylinders with a direct injector and a high pressure fuel pump, and a return line connects the high pressure fuel pump to the fuel tank for returning fuel vapor to the fuel tank. An evacuation line connects the fuel tank to the internal combustion engine to evacuate fuel vapor from the fuel tank and cool the fuel tank by evaporative cooling In one embodiment, the evacuation line is connected to each of the plurality of cylinders by one of a plurality of port injectors and a plurality of direct injectors. In another embodiment, the evacuation line is connected to each of the plurality of cylinders via a common port injector that is located upstream of the plurality of cylinders. In one embodiment, the evacuation of the fuel vapor can be controlled to occur in response to a load condition of the internal combustion engine being less than a threshold amount.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine system including an internal combustion engine with a plurality of cylinders that receive a charge flow and a fuel from a fuel tank of a fuel system; and
   maintaining a temperature of the fuel tank below a temperature threshold associated with a pressure relief condition of the fuel tank, wherein maintaining the temperature includes evacuating a fuel vapor from the fuel tank for combustion by the internal combustion engine, wherein maintaining the temperature of the fuel tank includes opening a control valve to evacuate the fuel vapor to the internal combustion engine and evaporate fuel in the fuel tank to cool and reduce pressure in the fuel tank.

2. The method of claim 1, wherein maintaining the temperature includes evacuating the fuel vapor from the fuel tank to an intake system of the internal combustion engine.

3. The method of claim 2, wherein the fuel vapor is evacuated to a compressor of the intake system.

4. The method of claim 2, wherein the fuel vapor is evacuated into a direct injector connected to an intake flow to the plurality of cylinders, wherein the direct injector is dedicated to providing evacuated fuel vapor to the one of the plurality of cylinders.

5. The method of claim 2, wherein the evacuation of the fuel vapor is controlled to occur only during a load condition of the internal combustion engine that is than a threshold amount.

6. A system, comprising:
an internal combustion engine including a plurality of cylinders that receive a fuel from a fuel tank, wherein the fuel tank is connected to each of the plurality of cylinders with a plurality of direct injectors and a high pressure fuel pump;
a return line connecting the high pressure fuel pump to the fuel tank for returning fuel to the fuel tank;
an evacuation line connecting the fuel tank to the internal combustion engine to evacuate fuel vapor from the fuel tank by evaporative cooling; and
a controller configured to determine at least one of a pressure condition and a temperature condition of the fuel tank and open a control valve connected to the evacuation line in response to the at least one of the pressure condition and the temperature condition to evacuate fuel vapor from the fuel tank to the internal combustion engine and to evaporate fuel in the fuel tank to cool and reduce pressure in the fuel tank.

7. The system of claim 6, wherein the evacuation line is connected to each of the plurality of cylinders by a plurality of second direct injectors dedicated to providing evacuated fuel vapor to the plurality of cylinders.

8. The system of claim 6, wherein the evacuation line is connected to each of the plurality of cylinders via a common port injector that is located upstream of the plurality of cylinders and downstream of a compressor in an intake system of the internal combustion engine.

9. The system of claim 6, wherein the evacuation of the fuel vapor is controlled to occur only during a load condition of the internal combustion engine that is less than a threshold amount.

10. The system of claim 9, wherein the threshold amount is 50% of a peak load of the internal combustion engine.

11. The system of claim 9, wherein the threshold amount is 25% of a peak load of the internal combustion engine.

12. The system of claim 6, wherein the evacuation line is connected to at least one of the plurality of cylinders by at least one second direct injector dedicated to provide evacuated fuel vapor to the at least one of the plurality of cylinders, the at least one second direct injector being controlled by the controller independently of the plurality of direct injectors.

13. The system of claim 6, wherein the evacuation line is connected to the plurality of cylinders by respective ones of a plurality of port injectors located at intake ports of each of the plurality of cylinders.

14. The system of claim 6, further comprising a heat insulation barrier between the internal combustion engine and the fuel pump to thermally isolate the fuel pump from the internal combustion engine.

15. The system of claim 14, wherein the fuel pump includes a plurality of outwardly extending cooling fins for receiving ambient air circulating around the fuel pump.

16. The method of claim 2, wherein the fuel vapor is evacuated to a plurality of port injectors located at intake ports of respective ones of the plurality of cylinders.

17. The method of claim 2, wherein the fuel vapor is evacuated to a common intake port located upstream of a plurality of intake manifold ports of the plurality of cylinders and downstream of a compressor in the intake system.

18. The method of claim 5, wherein the threshold amount is 50% of a peak load of the internal combustion engine.

19. The method of claim 5, wherein the threshold amount is 25% of a peak load of the internal combustion engine.

20. The method of claim 1, wherein the temperature threshold is a target temperature of the fuel tank.

* * * * *